United States Patent Office 2,831,769
Patented Apr. 22, 1958

2,831,769

PRESERVATION AND IMPROVEMENT OF ASSIMILABILITY OF FEEDING STUFFS

Jonas Kamlet, New York, N. Y., assignor to Crown Zellerbach Corporation, San Francisco, Calif., a corporation of Nevada No Drawing. Application August 11, 1955
Serial No. 527,860

11 Claims. (Cl. 99—2)

This invention relates to a method for the preservation and the improvement of the assimilability of feeding stuffs, and to the feeding stuffs prepared by this method. More particularly, it relates to a method whereby animal feeding stuffs, fodders, forages, silages and stovers may be preserved and stored over considerable periods of time without excessive losses of the nutritive values in such feeding stuffs and without excessive microbian and enzymatic degradation. Further, it relates to a method whereby the assimilability of the cellulose content of said feeding stuffs by ruminant animals may be improved, and the availability of such cellulosic components as sources of carbohydrate nutrients to the ruminant may be greatly increased. Further, it relates to the animal feeding stuffs, fodders, forages, silages and stovers of improved stability, increased nutritional value, better assimilability and higher availability prepared by this method. The purpose of this invention is to provide a simple and inexpensive method for the ensiling of a wide variety of animal feeding stuffs so as to preserve and protect their nutritional value over prolonged periods of storage and render them suitable for use on the farm, feeding lot, on the range and whenever animal husbandry is practiced, at any desired time. It is the further purpose of this invention to provide a simple and inexpensive method whereby may be greatly increased the conversion of the cellulose (crude fiber) content of such feeding stuffs to assimilable carbohydrates (as normally occurs in the rumens and associated organs of cattle, sheet, goats, etc. by the microbian and enzymatic processes of ruminant metabolism). It is a further purpose of this invention to provide a method for upgrading the huge quantities of low-grade (i. e. poorly assimilable) fodders, such as straws, hays, grasses, stovers, etc. available throughout the world, so as to improve their availability as nutrients to animals and convert them to the equivalent of higher quality feeding stuffs.

The basis of my invention is the unexpected finding that levulinic acid, added and admixed in minor amounts with animal feeding stuffs, fodders, silages and stovers, will effect the double purposes of:

(a) Improving the assimilability of the cellulose content of said feeding stuffs and increasing the availability of such cellulosic components as sources of carbohydrate nutrients for ruminant animals, and (b) Improving the stability, preserving and protecting such feeding stuffs against losses in nutrient values, bacterial and enzymatic degradation, during ensiling and storage.

It has been shown that certain factors present in the rumen juices will greatly stimulate and accelerate digestion of cellulose by rumen microorganisms and enzymes (Bentley, Johnson, Vanecko and Hunt, Journ. Animal Science, 13, 581 (1954)). These cellulolytic factors have been identified as consisting chiefly of caproic and n-valeric acid (Bentley, Lehmkuhl, Johnson, Hershberger and Moxon, Journ. Amer. Chem. Soc., 76, 5000 (1954)).

Employing the artificial rumen technique described by Huhtanen, Saunders and Gall (Journal of Dairy Science, 37, #3, 328–335 (March 1954)), with a medium containing glucose, mineral salts, biotin, p-aminobenzoic acid and a purified wood cellulose (the latter present to the extent of 2% by weight in the medium), it was found that the addition of various amounts of levulinic acid effected the following increases in the average percentage of cellulose digested, after a 36 hour fermentation period at 37° C. An inoculum of a commercially available concentrate of rumen microorganisms was employed in each case.

| Additions to basal medium: | Average cellulose digested |
|---|---|
| None | 18.5%. |
| 0.005% levulinic acid | 24.8% (34% increase). |
| 0.010% levulinic acid | 38.2% (106% increase). |
| 0.020% levulinic acid | 42.6% (130% increase). |
| 0.050% levulinic acid | 50.9% (175% increase). |
| 0.010% n-caproic acid | 41.6% (125% increase). |
| 0.010% n-valeric acid | 40.2% (117% increase). |

The procedure employed for the determination of the undigested cellulose is the modification of the anthrone method of Viles et al. (Anal. Chem., 21, 950 (1948)) described by Huhtanen et al. (cited supra).

In order to evaluate the suitability of levulinic acid as an agent for improving the availability of cellulose in ruminant feeding stuffs, at different concentration levels, the following experiments were undertaken. Oat straw, which is a low-grade cellulosic feeding stuff, was employed as the major source of digestible cellulose.

Six head of cattle are fed daily with a basic ration of 30 lbs. of oat straw, 5 lbs. of molasses and 5 lbs. of grain mixture. The grain mixture contains 44% yellow corn meal, 22% wheat bran, 22% ground oats, 11% soybean cake meal and 1% iodized salt. The cattle are kept on this ration for six days until a metabolic balance is established. For three days thereafter, the feces are collected and analyzed for undigested cellulose, as is the ration analyzed for cellulose content. The methods of Crampton and Maynard (Journal of Nutrition, 15, #4, 383–395 (1938)) are employed.

Thereafter, levulinic acid is added in varying amounts to the basic ration. A further six day feeding period is allowed to elapse until metabolic balance is reestablished, and undigested cellulose in the feces is then determined again, for a three day feeding period, and so forth.

The average assimilation of the cellulose in the ration, with and without the addition of levulinic acid, on the basis of recovery of undigested cellulose in the feces, is as follows:

| Added to basic ration: | Percent digestibility of cellulose |
|---|---|
| No additive | 21.4%. |
| 5 lbs. levulinic acid per ton | 28.2% (31.8% increase). |
| 10 lbs. levulinic acid per ton | 34.6% (61.7% increase). |
| 15 lbs. levulinic acid per ton | 39.0% (82.2% increase). |
| 20 lbs. levulinic acid per ton | 40.2% (87.9% increase). |
| 25 lbs. levulinic acid per ton | 41.2% (92.5% increase). |

Thus, it can be seen that the addition of from 5 to 25 lbs. of levulinic acid to each ton of the fodder, increases the assimilability of the cellulose contained therein to the extent of from one-third to almost doubling its availability as a source of carbohydrate to the animal.

This increase in assimilability of the cellulose content and increasing its availability as a nutrient and carbohydrate source for ruminants by the addition of minor amounts of levulinic acid is also observed with a wide variety of cellulose-containing feeding stuffs, fodders, forages, silages and stovers, such as hays and straws (e. g. from clover, alfalfa, timothy, soybean, prairie grass, cowpea, sorghum, millet, peavine, vetch, Johnson grass, barely, spelt, kaffir, milo, kaoling, bluegrass, Bermuda grass, peanut hay, kudzu vine, crabgrass, lespediza), by-products of corn, cereals and grains processing (corn stover (corn silage, rye bran, wheat bran, corncobs, corn shop, hominy meal, rice hulls, rice bran), as well as the waste newsprint which I have shown to be an excellent source of cellulosic fodders and have claimed in my copending patent application Serial No. 375,298 (issued August 9, 1955 as U. S. Patent No. 2,715,067. The addition of 5 to 25 lbs. of levulinic acid to each ton of fodders, forages, silages and similar animal feeding rations containing such components will increase the availability and assimilability of the cellulose contained therein from 20% to 100%. These proportions are, however, by no means critical since the amount of levulinic acid admixed with the feeding stuffs may vary over very wide limits without changing the basis and nature of this invention.

A further and highly important function of the addition of levulinic acid to feeding stuffs in accordance with my invention is in the preparing of silage and for the preservation and storage of fodders, forages, stovers and other types of animal feeds.

Following the recognition of the significance of lactic and butyric acid fermentations in the conservation of fresh fodders and in the ensiling of forage crops, much work has been done on the addition of various acids in the preservation of such feeding stuffs and in the preparation of silages. Virtanen largely pioneered this development and the use of his "A. I. V. solution" for the ensiling of hay and grass crops is coming into increasing use (Proc. Sixth International Grassland Congress, pp. 1147–1152; Economic Proc. Royal Dublin Society, 3, 311–342 (1947); Nature, 168, 294 (1951); Schweiz, Landwirt. Monatshefte, 10, 1–5 (1932); Ber. Milchwirtschaft Weltkongresses Berlin 1937, 180–187; Monthly Bull. Agr. Science & Practice, 27, #10, 371–393T (1936)). The "A. I. V. solution" consists of a mixture of 5 parts of hydrochloric acid and 1 part of sulfuric acid, diluted with 4 to 5 volumes of water. The basis of Virtanen's development is the discovery that the addition of this "A. I. V. solution" to green silage (in amounts of 5% to 8% on the weight of the silage) to bring the acidity of the silage to between pH 3.0 and pH 4.0, greatly suppresses bacterial, microbian and enzymatic fermentation and degradation, and serves to preserve and maintain the nutrient qualities of the feeding stuffs. Other acids (such as formic acid, phosphoric acid, oxalic acid), acidic salts (such as formates, phosphates, oxalates) and mixtures of such acids and salts with nitrates have also been developed for this purpose.

I have found that the addition of minor amounts of levulinic acid to feeding stuffs, fodders, forages, silages and stovers, will serve to preserve such animal feeds and make them suitable for storage and subsequent use in animal husbandry. The amount of levulinic acid so used may vary over wide ranges, and I do not wish to be limited to any specified range of levulinic acid addition to such silages. I have further found that:

(a) Good preserving of silages can be effected by the addition of from 5 to 25 lbs. of levulinic acid to every ton of the feeding stuff, and (b) An excellent preservation of silages can be effected by the addition of from 5 to 25 lbs. of levulinic acid to every ton of the feeding stuff, with concomitant or subsequent acidification of the feeding stuff to between pH 3.0 and pH 4.0 with Virtanen's "A. I. V. solution," hydrochloric acid, sulfuric acid, phosphoric acid, formic acid or in fact any of the acidulants previously developed for this purpose.

To demonstrate this preserving action of levulinic acid on a silage prepared from alfalfa, stored six months in a concrete silo, with varying amounts of levulinic acid added, and with and without acidification to pH 3.5 with "A. I. V. solution" prior to storage, the following results may be summarized:

Analysis of silage prior to storage: water—81.20%; dry matter—18.80%; organic matter—16.21%; protein—3.81%; lipoids—0.82%; cellulose—6.20%; ash—1.82%; N-free extract—6.12%.

Loss or gain in analyses of components after six month storage (average):

| Experiment | 1 | 2 | 3 | 4 | 5 | 6 | 7 | 8 | 9 |
|---|---|---|---|---|---|---|---|---|---|
| Water | 2% L | 3% L | 3% L | 2% L | 0% L | 1% L | 1% L | 2% L | 2% G |
| Dry Matter | 14% L | 3% L | 2% L | 2% L | 2% L | 1% L | 1% L | 1% L | 0% |
| Organic Matter | 16% L | 5% L | 3% L | 3% L | 4% L | 1% G | 1% G | 2% G | 1% G |
| Protein | 32% L | 4% L | 5% L | 3% L | 3% L | 2% L | 2% L | 2% L | 1% L |
| Lipoids | 41% G | 42% G | 44% G | 38% G | 32% G | 34% G | 29% G | 36% G | 32% G |
| Cellulose | 5% L | 4% L | 6% L | 6% L | 5% L | 6% L | 5% L | 5% L | 6% G |
| Ash | 4% G | 5% L | 4% G | 3% L | 5% L | 5% L | 6% L | 1% L | 0% |
| N-free extract | 36% L | 6% L | 5% L | 5% L | 4% L | 5% L | 6% L | 4% L | 3% L |

L = loss in weight. G = gain in weight. The experiments are identified as follows:
(1) No preservative.
(2) 5 lbs. per ton levulinic acid.
(3) 10 lbs. per ton levulinic acid.
(4) 17½ lbs. per ton levulinic acid.
(5) 25 lbs. per ton levulinic acid.
(6) 5 lbs. per ton levulinic acid adjusted to pH 3.5.
(7) 10 lbs. per ton levulinic acid adjusted to pH 3.5.
(8) 17½ lbs. per ton levulinic acid adjusted to pH 3.5.
(9) 25 lbs. per ton levulinic acid adjusted to pH 3.5.

Thus, it can be seen that the levulinic acid alone effects the following desirable results: up to an 85% diminution of losses in dry matter, up to an 80% diminution of losses in organic matter, up to a 90% diminution of losses of protein by bacterial and enzymatic degradation and up to a 90% diminution of losses in N-free extract.

It can further be seen that the levulinic acid coupled with acidification to pH 3.5 effects the following desirable results: almost complete avoidance of losses in dry matter, up to a 94% diminution of losses in organic matter, up to a 97% diminution of losses of protein by bacterial and enzymatic degradation, and up to a 92% diminution of losses in N-free extract.

This preservation of the nutrient values of animal feeding stuffs by the addition of minor amounts of levulinic acid with or without acidification to a reaction between pH 3.0 and pH 4.0, is applicable to all types of feeding stuffs, fodders, forages, silages and stovers, derived from hays and straws, by-products of corn, cereals and grains processing, waste newsprint, etc. (as above enumerated) as well as to the various types of root crops often used for the preparation of silages, such as mangels, sugar beets, rutabagas, turnips, carrots, melons, squash, parsnips, kohlrabi, cabbage, rape, kale, potatoes, artichokes, cassavas, as well as apples and apple pomace.

Levulinic acid is a compound of formula $$CH_3COCH_2CH_2COOH$$

When pure, it melts at 33°–35° C. and boils at 245°–246° C./760 mm. It may be prepared simply and inexpensively by the reactions of carbohydrates (such as sucrose, glucose, molasses, starch, etc.), wood, wood waste, cellulose or agricultural wastes, with mineral acids (e. g. hydrochloric, sulfuric, hydrobromic) at advanced temperatures and pressures; (Haworth and Wiggins, British Patent 583,533 (1946); Meyer, U. S. Patent 2,382,572 (1945); Ploetz et al., Naturwiss., 29, 707-9 (1941), Berichte, 74B, 1456-9 (1941); Scheuing and Konz, U. S. Patent 2,305,738 (1942); Sumeki and Kojima, Journ. Agr. Chem. Soc. Japan, 23, 286-288 (1950); Thomas and Schuette, Journ. Amer. Chem. Soc., 53, 2324-8 (1931); Frost and Kurth, Tappi, 34, #2, 80-86 (1951); Shanmukha et al., Journ. Scient. Ind. Res. India, 12B, 188-190 (1953); Ramachandran et al., Indian Patent 46,416 (1953)).

It must be emphasized that it is not necessary to use pure levulinic acid in effecting this invention. It is entirely feasible to employ the crude hydrolysis products of carbohydrate or woody raw materials directly, or with concentration but without further purification, as the source of levulinic acid added to feeding stuffs according to this invention.

Thus, it is feasible to start with a reaction mixture of molasses, hydrochloric acid and NaBr (added as a catalyst) containing 28% of carbohydrate, 6.5% of HCl and 1.67% of NaBr. This mixture is heated in the autoclave at 160° C. to 170° C. (maximum pressure—175 p. s. i.) for one hour. The aqueous contents of the autoclave are then distilled off, and by this means the major portion of the hydrochloric acid and the bromide ion (as HBr) is recovered for re-use in the hydrolysis of subsequent batches.

The crude levulinic acid remaining behind in a yield of 45% on the carbohydrate, together with smaller amounts of formic acid, humin substances and other by-products of the hydrolysis, is ideally suited for addition to animal feeding stuffs according to this invention. It is not even necessary to distill off the acid after the hydrolysis. The entire hydrolysis product, with or without prior concentration, can be mixed with the feeding stuff, the acid serving as all or part of the acidulant required to bring the reaction to pH 3.0-4.0.

Thus, in the conversion of cane or beet molasses by the acid hydrolysis above described, sulfuric acid may be employed in the presence of a catalytic amount of a bromide. At the conclusion of the hydrolysis, the water and the bromide (as HBr) can be distilled off and the catalyst recovered for re-use. The crude residue containing levulinic acid, sulfuric acid, humin substances and other by-products of the hydrolysis, can be employed as a preservative and ensiling agent and for increasing availability and assimilability of animal feeding stuffs, in accordance with this invention. The mineral acid remaining behind in the crude levulinic acid enhances its silage preserving qualities as hereinabove described.

Similarly, the preparation of a levulinic acid-containing product for use in this invention, may be integrated with the recovery of furfural, by the acid hydrolysis of wood and wood wastes (Frost and Kurth, cited supra). Here too, the acid employed as a hydrolytic agent, may be partially or totally allowed to remain behind with the levulinic acid in the end-product, serving as the acidulant for the silage.

Levulinic acid, whether purified or crude, or in admixture with the by-products of the acid hydrolysis of carbohydrates or wood products is non-toxic and completely acceptable to and palatable by ruminant and non-ruminant livestock.

The levulinic acid-treated feeding stuffs prepared in accordance with this invention may further be admixed with any other components of animal fodders, such as protein cake, urea, molasses, ammoniated molasses, beet pulp, ammoniated beet pulp, salt, mineral mixtures, feed supplements of any nature whatever, antibiotics, hormones, estrogenic substances, et cetera.

Having described my invention, what I claim and desire to protect by Letters Patent is:

1. A method for increasing the conversion of the cellulose in ruminant animal feeds into assimilable carbohydrate nutrients which comprises adding to said feeds a minor amount of levulinic acid.

2. A method for increasing the conversion of the cellulose in ruminant animal feeds into assimilable carbohydrate nutrients which comprises adding from 5 to 25 lbs. of levulinic acid to every ton of said animal feeds.

3. The method for increasing the conversion into assimilable carbohydrate nutrients of the cellulose in ruminant animal feeding stuffs derived from at least one member of the group consisting of grass, hay, straw, by-products of corn, cereals and grain processing, root crops and waste newsprint, which comprises adding to said feeding stuffs a minor amount of levulinic acid.

4. A method for preparing silage which comprises adding to the feeding stuff being ensiled a minor amount of levulinic acid.

5. A method for preparing silage which comprises adding to the feeding stuff being ensiled from 5 to 25 lbs. of levulinic acid for every ton of silage.

6. A method for preparing silage which comprises adding to the feeding stuff being ensiled from 5 to 25 lbs. of levulinic acid for every ton of silage, and acidifying to a reaction between pH 3 and 4.

7. Cellulosic animal feeds containing minor amounts of levulinic acid.

8. Cellulosic animal feeds containing from 5 to 25 pounds of levulinic acid per ton of said feed.

9. Silages containing minor amounts of levulinic acid.

10. Silages containing from 5 to 25 pounds of levulinic acid per ton of said silages.

11. Silages containing from 5 to 25 pounds of levulinic acid per ton of said silages, and acidified to a reaction between pH 3 and pH 4.

References Cited in the file of this patent

UNITED STATES PATENTS 2,476,802    Bollens _____ July 19, 1949